United States Patent
O'Brien (10) Patent No.: US 7,810,087 B2
(45) Date of Patent: Oct. 5, 2010

(54) METHOD AND APPARATUS FOR INSERTING CODE FIXES INTO APPLICATIONS AT RUNTIME

(75) Inventor: Thomas Edward O'Brien, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/132,468

(22) Filed: Jun. 3, 2008

(65) Prior Publication Data

US 2008/0229300 A1  Sep. 18, 2008

Related U.S. Application Data

(63) Continuation of application No. 11/239,502, filed on Sep. 29, 2005.

(51) Int. Cl.
*G06F 9/44* (2006.01)
(52) U.S. Cl. ........................ 717/168; 717/127
(58) Field of Classification Search ............... 717/168, 717/171–174, 176–178, 127
See application file for complete search history.

(56) References Cited

U.S. PATENT DOCUMENTS

| 5,355,469 | A | * | 10/1994 | Sparks et al. ............... 714/38 |
| 5,437,033 | A | * | 7/1995 | Inoue et al. ................. 714/10 |
| 5,699,275 | A | * | 12/1997 | Beasley et al. ............. 709/221 |
| 6,018,747 | A | | 1/2000 | Burns et al. |
| 6,507,875 | B1 | * | 1/2003 | Mellen-Garnett et al. ... 719/310 |
| 6,760,908 | B2 | * | 7/2004 | Ren ............................ 717/173 |
| 6,912,591 | B2 | * | 6/2005 | Lash .......................... 709/246 |
| 2001/0051928 | A1 | * | 12/2001 | Brody ......................... 705/52 |
| 2003/0074605 | A1 | * | 4/2003 | Morimoto et al. ............. 714/38 |
| 2003/0182463 | A1 | | 9/2003 | Valk |
| 2004/0046785 | A1 | | 3/2004 | Keller |
| 2005/0060432 | A1 | * | 3/2005 | Husain et al. ............... 709/246 |
| 2006/0048226 | A1 | | 3/2006 | Rits et al. |
| 2006/0156296 | A1 | | 7/2006 | Goldberg |
| 2007/0060373 | A1 | * | 3/2007 | Beverly ....................... 463/42 |

OTHER PUBLICATIONS

Tikir et al. "Efficient Instrumentation for Code Coverage Testing", Jul. 2002, ACM, pp. 86-96.*
Roth et al. "A Distributed Content-Based Search Engine Based on Mobile Code", Mar. 2005, ACM, pp. 66-73.*
Technical Standard—Application Response Measurement (ARM) Issue 4.0, Version 2-C Binding, The Open Group, Dec. 2004, United Kingdom, pp. 1-120.

* cited by examiner

*Primary Examiner*—Anna Deng
(74) *Attorney, Agent, or Firm*—Yee & Associates, P.C.; Jeffrey S. LaBaw (57) ABSTRACT

A method, an apparatus, and computer instructions are provided for inserting code fixes into applications at runtime. One aspect of the present invention leverages capability of a just-in-time-instrumentation monitoring component to receive a code fix during execution of applications and insert code fixes into applications. Another aspect of the present invention allows users to create a custom class loader that loads a custom class at runtime. The custom class loader then inserts the custom class in the applications. With the aspects of the present invention, code fixes and patches may be applied to applications without taking the applications down.

11 Claims, 5 Drawing Sheets

METHOD AND APPARATUS FOR INSERTING CODE FIXES INTO APPLICATIONS AT RUNTIME

This application is a continuation of application Ser. No. 11/239,502, filed Sep. 29, 2005, status pending.

BACKGROUND OF THE INVENTION

1. Field of the Invention

The present invention relates generally to an improved data processing system. In particular, the present invention relates to applications in a data processing system. Still more particular, the present invention relates to a computer implemented method, apparatus, and computer usable program code for inserting code fixes into applications in a data processing system at runtime.

2. Description of the Related Art

Currently, maintenance to applications, such as critical applications, requires that the applications to be taken down before fixes or patches may be applied. "Critical applications" are applications that are needed by an organization to perform functions deemed critical to their business. An organization, may be, for example an Internet-based business. Examples of critical applications include Web-based applications of a service provider, database management applications, and legacy applications.

If the critical application is a service-oriented application, such as, a Web-based application, the requirement of application down time in order to apply fixes and patches creates a problem for both the service consumers and the service providers. This problem not only affects convenience of the consumers who want to acquire the service, but also affects the revenue possibly generated by the service providers.

No mechanism currently exists that allows maintenance fixes and patches to be applied without taking down the applications. In addition, no mechanism currently exists that automatically detects the need for fixes and patches and applies the needed fixes and patches at runtime without taking down the applications.

SUMMARY OF THE INVENTION

The aspects of the present invention provide a method, an apparatus, and computer instructions for inserting code fixes into applications at runtime. A monitoring engine receives a code fix for an application during execution of the application. A monitoring component inserts the code fix into the application without stopping execution of the application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
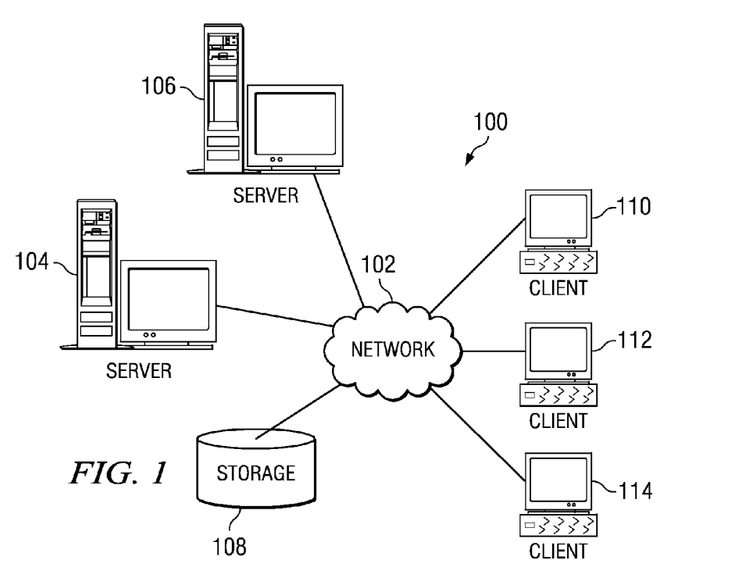
FIG. 1 depicts a pictorial representation of a network of data processing systems in which aspects of the present invention may be implemented.
Figure 2:
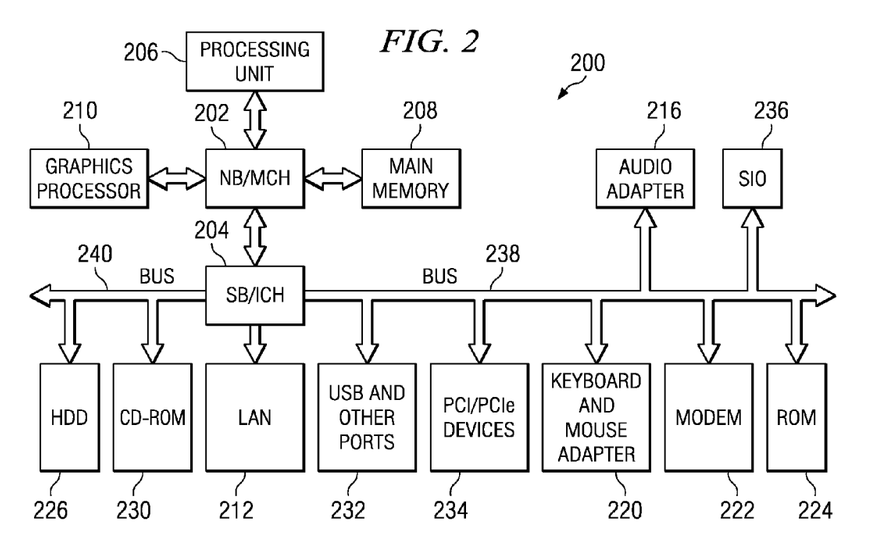
FIG. 2 is a block diagram of a data processing system in accordance with an illustrative embodiment of the present invention.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java™ is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or the LINUX operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
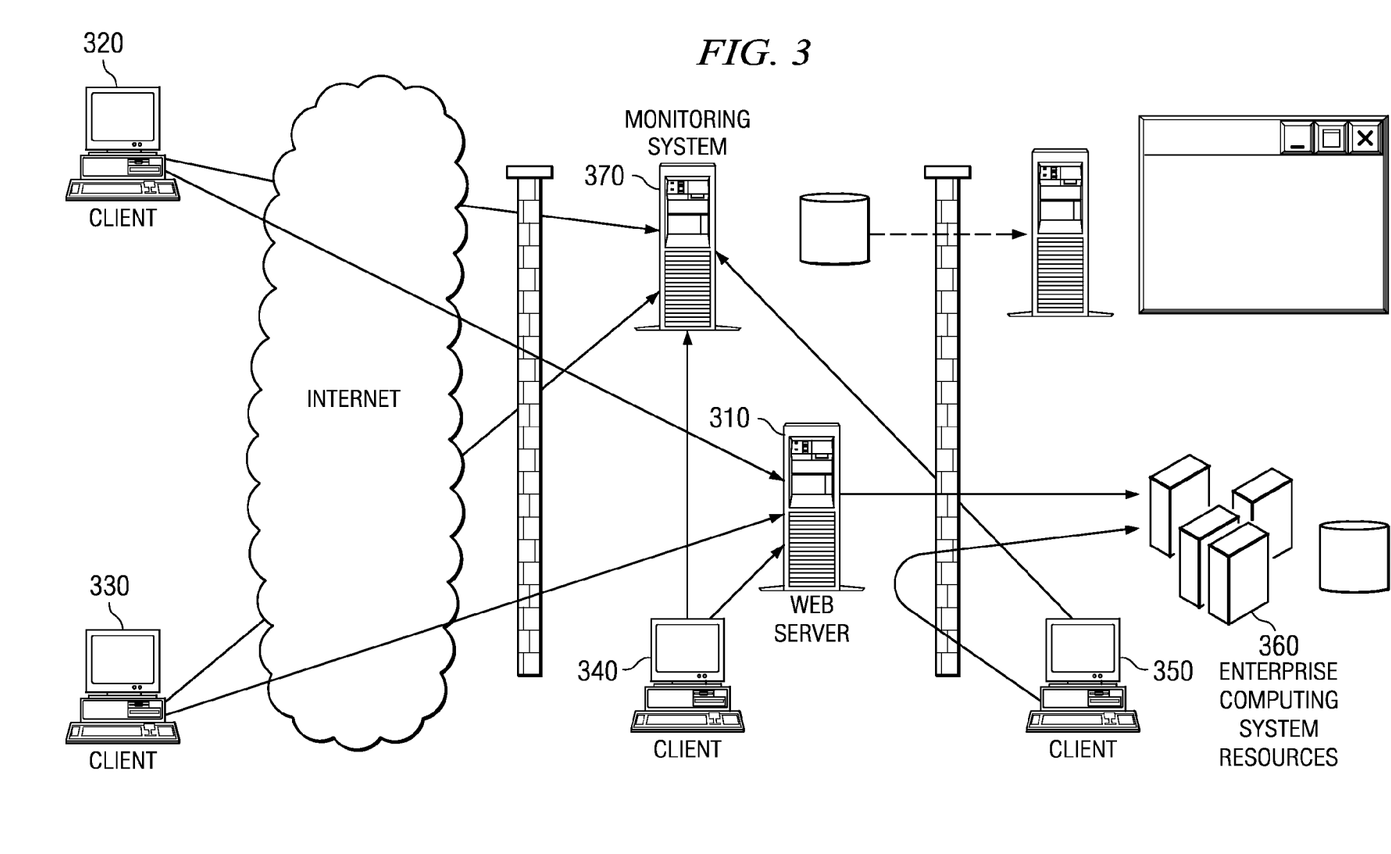
FIG. 3 is an exemplary diagram of an electronic business system with a performance monitoring architecture, in accordance with an illustrative embodiment of the present invention.

Turning now to FIG. 3, an exemplary diagram of an electronic business system with a performance monitoring architecture is shown in accordance with an illustrative embodiment of the present invention. Client devices 320-350 may communicate with Web server 310 in order to obtain access to services provided by the back-end enterprise computing system resources 360. Performance monitoring system 370 is provided for monitoring the processing of requests by the Web server 310 and enterprise computing system resources 360.

Web server 310, enterprise computing system resources 360 and performance monitoring system 370 are part of an enterprise system. Client devices 320-350 may submit requests to the enterprise system via Web server 310, causing requests to be created. The requests are processed by Web server 310 and enterprise computing system resources 360. Performance monitoring system 370 monitors the performance of Web server 310 and enterprise computing system resources 360 as they process the requests.

This performance monitoring involves collecting and storing data regarding performance parameters of the various components of Web server 310 and enterprise computing system resources 360. For example, monitoring of performance may involve collecting and storing information regarding the amount of time a particular component spends processing a request, a SQL query, component information including class name and instance ID in the JAVA Virtual Machine (JVM), memory usage statistics, any properties of the state of the JVM, properties of the components of the JVM, and/or properties of the system in general.

The components of Web server 310 and enterprise computing system resources 360 may include both hardware and software components. For example, the components may include host systems, JAVA Server Pages, servlets, entity beans, Enterprise Java Beans, data connections, and the like. Each component may have its own set of performance characteristics, which may be collected and stored by performance monitoring system 370 in order, to obtain an indication as to how the enterprise system is handling requests.

The aspects of the present invention provide a method, an apparatus, and computer instructions for inserting code fixes into applications at runtime. Instead of monitoring performance of requests that are processed by Web servers and enterprise computing system resources, the aspects of the present invention extend capabilities of components in a performance monitoring system, such as performance monitoring system 370 in FIG. 3, to insert maintenance fixes or patches into applications while the applications continue to execute. The aspects of the present invention insert these code fixes in a manner that does not require stopping or terminating execution of the applications. In particular, the illustrative embodiments place a "fixed" class that is defined by a vendor who provided the monitored application or an in house developer who developed the in house application in place of an existing broken class during run time. Applications may be enterprise applications that are executed on Web servers, such as Web server 310, or on enterprise computing system resources, such as enterprise computing system resources 360.

In one example implementation, aspects of the present invention may be implemented using prior art techniques, such as a JITI or a J2EE monitoring component, to insert code fixes in place of a broken code segment in the application at runtime. Examples of a broken code segment include a broken method of a class, a runtime environment different from an environment required by the class, or other failed aspects of the class. In addition to using aspect-oriented programming techniques, such as the JITI or the J2EE monitoring component, other prior art instrumentation techniques may be used without departing the spirit and scope of the present invention.

JITI is an aspect-oriented programming technique that weaves response time and other measurement operations into applications for monitoring performance. JITI provides the ability to manipulate the byte code of a monitored Java application at runtime in a manner similar to Byte Code Engineering Library (BCEL). BCEL allows developers to implement desired features on a high level of abstraction without handling all the internal details of the Java class file format. JITI adds new byte codes to the application classes to provide hooks, such that the application may run in a manner similar to aspect-oriented programming tools, such as AspectJ.

One aspect of the present invention leverages the capability of JITI or J2EE monitoring component to detect a broken code segment in applications and insert code fixes into the applications in place of the broken code segment. Alternatively, without a detection of an error or a broken code segment, one or the JITI or J2EE monitoring component may receive one or more code fixes and insert into the applications without disrupting operations of the applications. Instead of gathering performance measurement information, such as, the response time and other measurement data, the aspect of the present invention extends the capability of the Application Responsive Measurement (ARM) engine to gather operational information, such as failures or errors that are generated by the applications, and the capability of the monitoring engine to determine if code fixes are necessary.

ARM is a standard for measuring response time measurements and status of requests. ARM employs an ARM engine, which records response time measurements of the requests. For example, in order to measure a response time, an application invokes a 'start' method using ARM, which creates a transaction instance to capture and save a timestamp. After the transaction ends, the application invokes a 'stop' method using ARM to capture a stop time. The difference between a start and a stop time is the response time of the transaction. More information regarding the manner by which transaction monitoring systems collect performance data, stores it, and uses it to generate reports and transaction graph data structures may be obtained from the ARM Specification, version 4.0, which is hereby incorporated by reference.

The aspect of the present invention extends the ARM standard to gather operational information in the ARM engine, such that failures and errors that are generated by the applications may be collected. Operational information is information that is collected from the applications at runtime, for example, errors, failures, and other alerts that are generated by the applications. If the aspect of the present invention in the monitoring engine determines that code fixes are necessary based on the collected operational information, without disrupting the operation of the application, the aspect of the present invention in the monitoring component inserts code fixes into the application at runtime by replacing the detected broken code segment with code fixes that are necessary to correct the error or failure. In an illustrative embodiment, the aspect of the present invention in the monitoring engine monitors for faults through the use of the ARM engine. Where a fault is recognized by the ARM engine and can be isolated to a particular code segment, the JITI or J2EE monitoring component patch tool may search a library of code fixes for code fixes or a patch for the broken code segment. In this way, the error or failure may be corrected by applying code fixes without taking down the application.

Alternatively, a vendor or an in-house application developer may proactively provide a code fix to the applications prior to a known error being detected. In this case, the aspect of the present invention in the monitoring component inserts the code fix into the application without stopping execution of the application.

Figure 4:
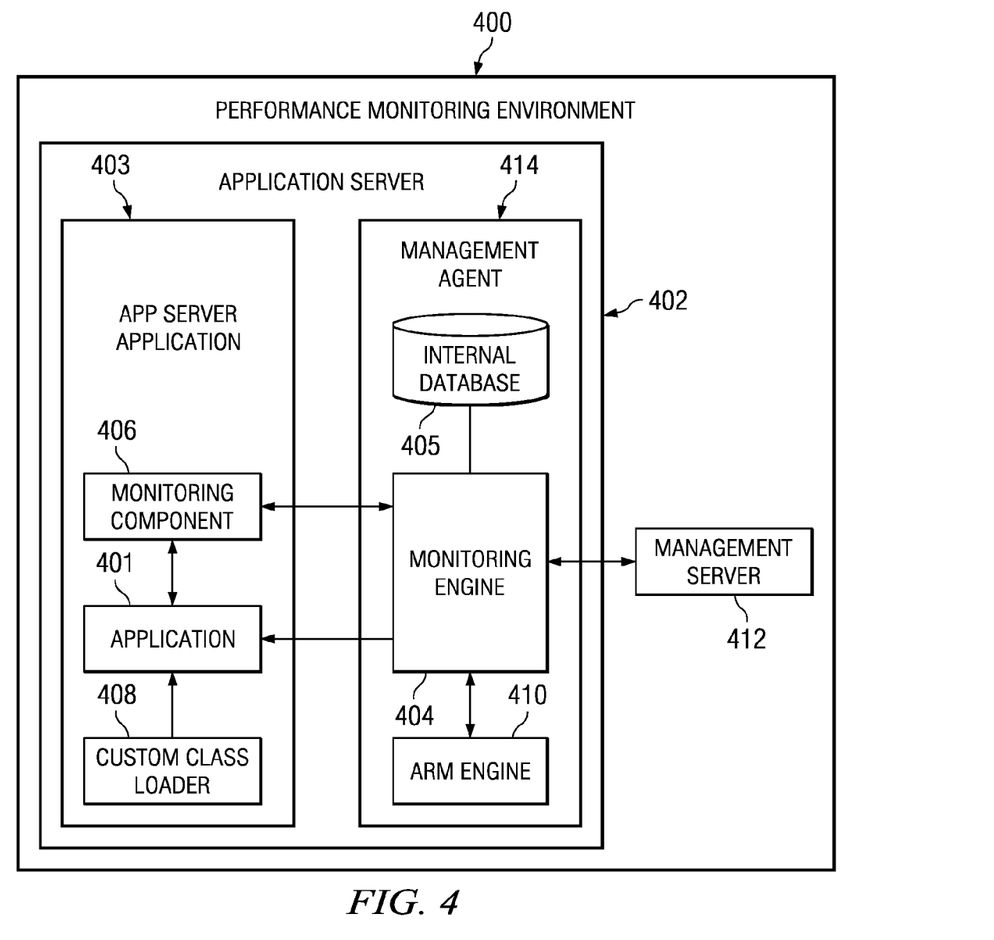
FIG. 4 is a diagram illustrating interactions between components for inserting code fixes into applications at runtime, in accordance with an illustrative embodiment of the present invention.

Turning now to FIG. 4, a diagram illustrating interactions between components for inserting code fixes into applications at runtime is depicted in accordance with an illustrative embodiment of the present invention. As depicted in FIG. 4, in this example implementation, within performance monitoring environment 400, application 401 resides on application server 402. Application server 402 may be implemented using an application server application 403, such as a WebSphere Application Server or a Microsoft .NET platform, a product available from Microsoft Corporation.

When the user configures application 401 to be monitored, the user deploys a monitoring component 406, such as the JITI or the J2EE monitoring component. In an illustrative embodiment, monitoring component 406 is deployed in application server application 403 to dynamically configure application 401 if an error or failure is encountered. Monitoring component 406 may be implemented using various aspect-oriented programming techniques, such as JITI, which is a specific implementation within performance monitoring application, such as performance monitoring system 370 in FIG. 3.

In addition, the user defines necessary code fixes and error conditions in monitoring component 406. Alternatively, a vendor who provides the application being monitored or an in house developer who developed an in house application may define necessary code fixes and error conditions in monitoring component 406. Next, an update of the necessary code fixes and error conditions as defined by the user, the vendor, or the in house developer is sent to monitoring engine 404 from management server 412. Associations between code fixes and error conditions may be stored in an internal database, such as internal database 405, within management agent 414 by monitoring engine 404. In an illustrative embodiment, monitoring engine 404 and ARM engine 410 are implemented as part of management agent 414. Management agent 414 is a mechanism distributed among different components of performance monitoring environment 400, such as application server 402. Management agent 414 may also reside on other components as described in FIG. 4, except management server 412. When monitoring engine 404 receives the updated code fixes and error conditions, monitoring engine 404 in turn notifies ARM engine 410.

At runtime, application 401 runs and ARM engine 410 gathers operational information, including error conditions that are generated by application 401, by intercepting the call and invoking an 'ARM_start' method on ARM engine 410. ARM engine 410 then collects any error of failure that is generated by application 401. Upon detecting an error or failure, ARM engine 410 notifies monitoring engine 404, which then matches error condition that is generated by application 401 against defined error conditions in internal database 405 to see if code fixes are necessary for the error condition encountered. An example of error condition may be a wrong runtime environment setup. If the code fixes are necessary for the error condition encountered, monitoring engine 404 notifies monitoring component 406, which inserts code fixes in place of the broken code segment in application 401 at runtime. In this way, the error condition encountered may be corrected without taking down application 401. For example, code fixes may be inserted to set the correct runtime environment at runtime.

In cases where the vendor or developer wants to insert a code fix into application 401 in anticipation of an error condition that is not yet detected by monitoring engine 404, monitoring engine 404 may perform a lookup of code fixes defined in internal database 405 and notify monitoring component 406 to insert the code fixes into application 401 at runtime.

By inserting code fixes into applications using JITI or J2EE monitoring component, a piece of the broken code may be replaced by code fixes that corrects a specific error or failure. However, errors and failures in the applications may occur due to more than one piece of broken or defective code. For example, multiple methods of a class may be defective. In that case, changes made to fix the broken class is so extensive that it will make more sense to swap out the entire class at runtime instead of inserting individual code fixes.

In order to alleviate this problem, another aspect of the present invention allows users to create a custom class loader, which may be executed at runtime. In addition, the user may define one or more custom classes, which include code fixes that handle different error conditions. If errors or failures are encountered in a class at runtime, instead of inserting code fixes to fix the specific piece of broken code within a broken class, the custom class loader loads a custom class that the user has defined for the errors or failures encountered and inserts the custom class in place of the broken class. In other words, the broken class is swapped out and replaced with the custom class. By swapping out the broken class and replacing it with a custom class, not only a method within the broken class may be fixed, other errors or failures that are encountered within the broken class may also be fixed.

Turning back to FIG. 4, if a determination is made that code fixes are necessary for the error conditions encountered, instead of inserting the code fixes into the application using the JITI or the J2EE monitoring component, custom class loader 408 is executed. In turn, custom class loader 408 swaps out the broken class with a user-defined custom class that handles the error conditions encountered.

Figure 5A:
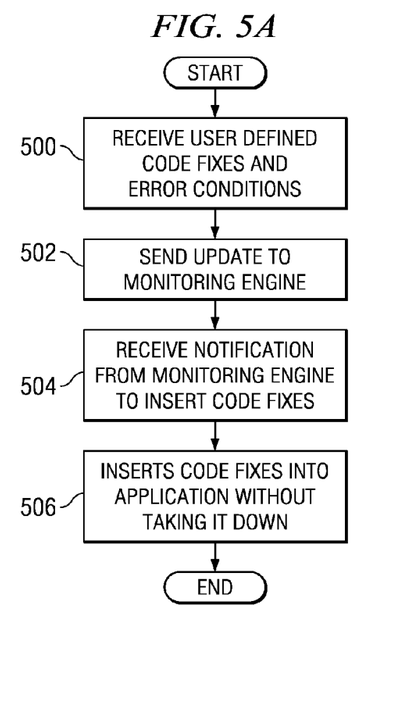
FIG. 5A is a flowchart of an exemplary process for inserting code fixes into applications at runtime from the perspective of a JITI or J2EE monitoring component, in accordance with an illustrative embodiment of the present invention.

Turning now to FIG. 5A, a flowchart of an exemplary process for inserting code fixes into applications at runtime from the perspective of a JITI or J2EE monitoring component is depicted in accordance with an illustrative embodiment of the present invention. This exemplary process may be implemented in a JITI or J2EE monitoring component, such as monitoring component 406 in FIG. 4. As shown in FIG. 5A, the process begins when a user definition of necessary code fixes and error conditions that may be generated by the application is received (step 500).

Once a user definition of necessary code fixes and error conditions is received, an update of necessary code fixes and error conditions are sent to the monitoring engine (step 502). Next, a notification is received from the monitoring engine to insert code fixes (step 504). In turn, the process inserts the necessary code fixes into the application without taking the application down (step 506). Thus, the process terminates thereafter.

Figure 5B:
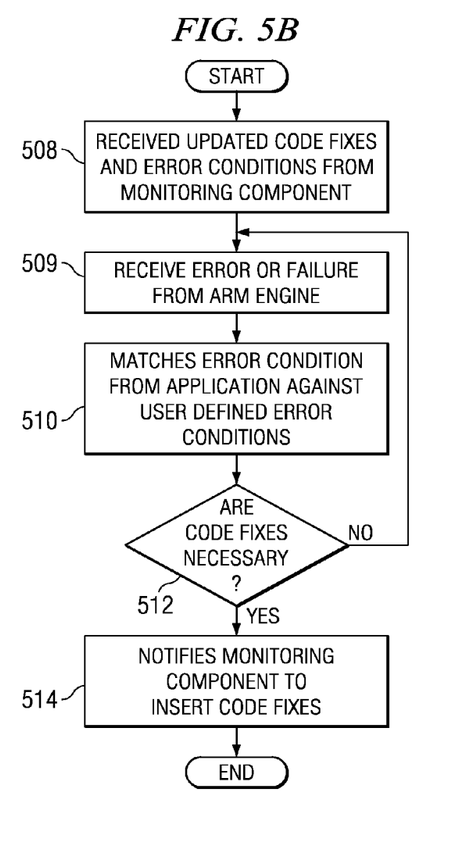
FIG. 5B is a flowchart of an exemplary process for determining if code fixes are necessary at runtime from the perspective of the monitoring engine, in accordance with an illustrative embodiment of the present invention.

Turning next to FIG. 5B, a flowchart of an exemplary process for determining if code fixes are necessary at runtime from the perspective of the monitoring engine is depicted in accordance with an illustrative embodiment of the present invention. This exemplary process may be implemented in a monitoring engine, such as monitoring engine 404 in FIG. 4. As shown in FIG. 5B, the process begins when an update of necessary code fixes and error conditions is received from the monitoring component (step 508).

Next, an error or failure is received from the ARM engine (step 522). This error or failure from the ARM engine is an error or failure generated by the application. The error or failure is then matched against the user defined error conditions received in step 508 (step 510). A determination is made as to whether code fixes are necessary for the error or failure (step 512). If code fixes are necessary, the process notifies the monitoring component to insert the code fixes (step 514). Thus, the process terminates thereafter. However, if it is determined that code fixes are not necessary, the process returns to step 510 until another error or failure is received from the ARM engine.

Figure 5C:
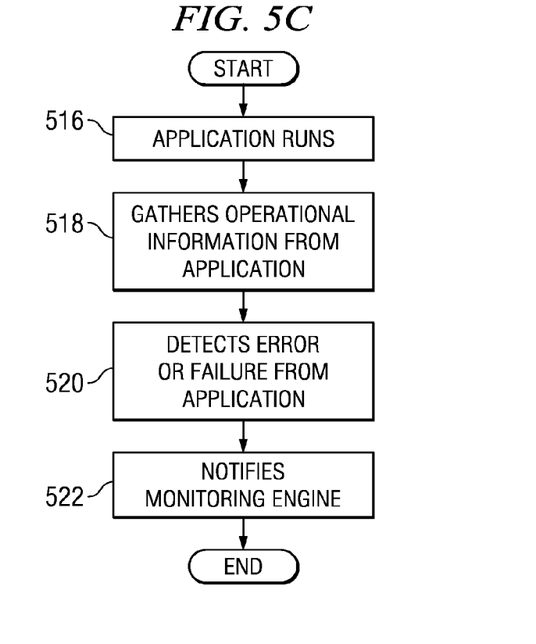
FIG. 5C is a flowchart of an exemplary process for gathering operational information at runtime from the perspective of the ARM engine, in accordance with an illustrative embodiment of the present invention.

Turning next to FIG. 5C, a flowchart of an exemplary process for gathering operational information at runtime from the perspective of the ARM engine is depicted in accordance with an illustrative embodiment of the present invention. This exemplary process may be implemented in an ARM engine, such as ARM engine 410 in FIG. 4. As shown in FIG. 5C, the process begins when the application runs (step 516) and operational information, including errors and failures generated by the application, is gathered (step 518). Next, an error or failure is detected from the application (step 520) and a notification of the error or failure is sent to the monitoring engine (step 522). Thus, the process terminates thereafter.

Figures 6A, 6B:
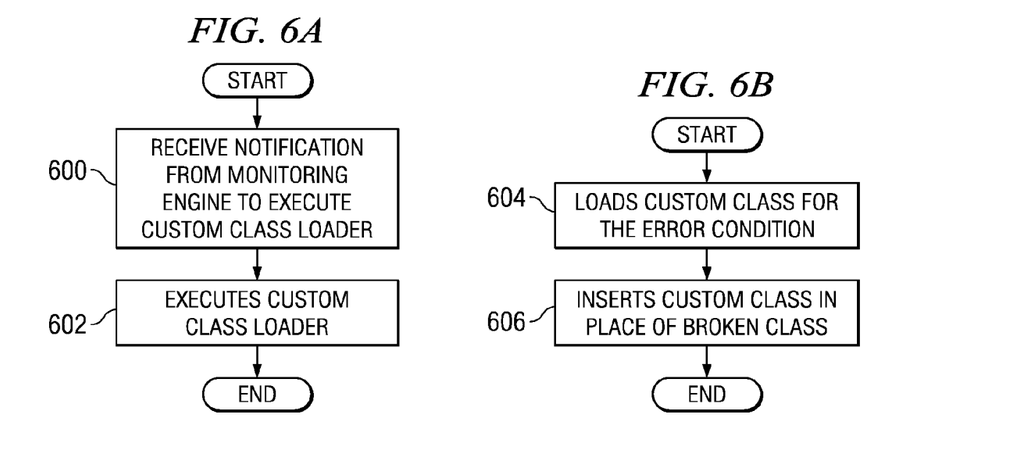
FIG. 6A is a flowchart of an exemplary process for executing a custom class loader from the perspective of a monitoring component, in accordance with an illustrative embodiment of the present invention.
FIG. 6B is a flowchart of an exemplary process for inserting a custom class in place of a broken class from the perspective of a custom class loader, in accordance with an illustrative embodiment of the present invention.

Turning next to FIG. 6A, a flowchart of an exemplary process for executing a custom class loader from the perspective of a monitoring component is depicted in accordance with an illustrative embodiment of the present invention. This exemplary process may be implemented in a monitoring component, such as monitoring component 406 in FIG. 4. As shown in FIG. 6A, the process begins when a notification from the monitoring engine is received to execute a custom class loader (step 600). The notification is received from the monitoring engine when the monitoring engine determines that code fixes are necessary. Next, the custom class loader, such as custom class loader 408 in FIG. 4, is executed (step 602).

Turning next to FIG. 6B, a flowchart of an exemplary process for inserting a custom class in place of a broken class from the perspective of a custom class loader is depicted in accordance with an illustrative embodiment of the present invention. This exemplary process may be implemented in a custom class loader, such as custom class loader 408 in FIG. 4. As shown in FIG. 6B, the process begins when a custom class for the error condition encountered is loaded (step 604). Finally, the custom class is inserted in place of the broken class (step 606) and the process terminates thereafter.

In summary, the aspects of the present invention leverage the capability of a JITI or a J2EE monitoring component to detect a broken code segment in an application and insert code fixes into the application to fix the broken code segment. In this way, applications may continue to operate even when error or failures are encountered. In addition, the aspects of the present invention allow users to define a custom class loader, which may be executed at runtime to load a custom class that fixes errors or failures encountered in a class. As a result, the broken class may be swapped out and substituted with a class without taking the application down for maintenance.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disc (DVD).

A data processing system is suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for inserting code fixes into applications at runtime, the computer implemented method comprising:

gathering, by a monitoring engine in a computer, operational information from an application;

monitoring execution of the application for occurrence of an error using the gathered operational information;

responsive to detecting an error, matching the detected error against a set of error conditions and corresponding code fixes;

if the detected error matches an error condition in the set of error conditions, selecting a code fix from the corresponding code fixes to which the detected error corresponds;

receiving, at a monitoring component in the computer, the selected code fix for the application from the monitoring engine during execution of the application; and inserting the code fix into the application without stopping execution of the application, wherein inserting the code fix into the application comprises inserting the code fix in place of broken code segment that generates the error during execution of the application.

2. The computer implemented method of claim 1, wherein the detected error comprises a plurality of errors in a same class, and wherein the code fix is a first class that replaces a second class in the application, wherein the second class causes the error.

3. The computer implemented method of claim 1, wherein the inserting step is performed by a monitoring component, and wherein the monitoring component is a just-in-time-instrumentation monitoring component.

4. The computer implemented method of claim 1, wherein the monitoring step is performed by an application response measurement engine and wherein the returning step is performed by a monitoring engine.

5. The computer implemented method of claim 1, wherein the operational information includes errors and failures generated by the application.

6. The computer implemented method of claim 1, further comprising:

executing a custom class loader;

loading a custom class from a plurality of custom classes; and inserting the custom class into the application without stopping execution of the application.

7. The computer implemented method of claim 6, wherein the custom class loader and the plurality of custom classes are defined by at least one of a user, a vendor, and an in house developer.

8. A data processing system for inserting code fixes into application at runtime, the data processing system comprising:

a bus, a storage device, wherein the storage device contains computer usable code;

a communications unit connected to the bus; and a processing unit connected to the bus, wherein the processing unit executes the computer usable code to gather operational information from an application;

monitor execution of the application for occurrence of an error using the gathered operational information;

responsive to detecting an error, match the detected error against a set of error conditions and corresponding code fixes;

if the detected error matches an error condition in the set of error conditions, select a code fix from the corresponding code fixes to which the detected error corresponds during execution of the application; and insert the code fix into the application without stopping execution of the application, wherein executing the computer usable code to insert the code fix into the application executes the computer usable code to insert the code fix in place of broken code segment that generates the error during execution of the application.

9. The data processing system of claim 8, wherein the processing unit further executes the computer usable code to execute a custom class loader; load a custom class from a plurality of custom classes; and insert the custom class into the application without stopping execution of the application.

10. A computer program product comprising:

a non-transitory computer usable storage medium having computer-usable program code for inserting code fixes into applications at runtime stored thereon, said computer program product including:

computer usable program code for gathering operational information from an application;

computer usable program code for monitoring execution of the application for occurrence of an error using the gathered operational information;

computer usable program code for matching, in response to detecting an error, the detected error against a set of error conditions and corresponding code fixes;

computer usable program code for selecting, if the detected error matches an error condition in the set of error conditions, a code fix from the corresponding code fixes to which the detected error corresponds;

computer usable program code for receiving the code fix for the application during execution of the application; and computer usable program code for inserting the code fix into the application without stopping execution of the application, wherein the computer usable program code for inserting the code fix into the application comprising inserting the code fix in place of broken code segment that generates the error during execution of the application.

11. The computer program product of claim 10, further comprising:

computer usable program code for executing a custom class loader;

computer usable program code for loading a custom class from a plurality of custom classes; and computer usable program code for inserting the custom class into the application without stopping execution of the application.

\* \* \* \* \*